United States Patent [19]
Jenison

[11] Patent Number: 5,175,623
[45] Date of Patent: Dec. 29, 1992

[54] METHOD AND APPARATUS FOR LINEAR VIDEO MIXER WITH DIGITAL CONTROL

[76] Inventor: Timothy P. Jenison, 6237 SW. 23rd St., Topeka, Kans. 66614

[21] Appl. No.: 680,576

[22] Filed: Apr. 4, 1991

[51] Int. Cl.⁵ .............................................. H04N 5/262
[52] U.S. Cl. .................................... 358/183; 358/181; 358/182; 364/602
[58] Field of Search .................. 358/22 CK, 182, 181, 358/183, 22; 364/602, 605

[56] References Cited

U.S. PATENT DOCUMENTS

| | | | |
|---|---|---|---|
| 3,530,234 | 9/1970 | Fenton | 358/183 |
| 3,728,479 | 4/1973 | Srinivasan | 358/182 |
| 3,772,502 | 11/1973 | Hodge et al. | 364/602 |
| 4,403,245 | 9/1983 | Wischermann | 358/22 |
| 5,027,213 | 6/1991 | Kamin | 358/182 |

FOREIGN PATENT DOCUMENTS 0054071 3/1988 Japan .

Primary Examiner—James J. Groody
Assistant Examiner—Jeffrey S. Murrell
Attorney, Agent, or Firm—Bruce J. Clark

[57] ABSTRACT

In a linear video mixer, two video signals are combined into a single output signal in response to any n bit byte digital control signal, the mixer having a buffered isolation input, a series of n electrically controlled double-throw type switches, each of whose control input is connected to a corresponding bit of the desired digital control signal; the two inputs of each switch are connected to one of the two respective buffered video signals to be mixed, and the output of each switch is connected to respective rungs of a 2R/R resistor ladder network that itself is connected to a buffer having relatively high output impedance; the most significant bit down to the least significant bit of the digital control word is connected to the switches in the switch-ladder network to achieve the desired output, which in combination with the resistor ladder network, will achieve the desired combination of input video signals.

3 Claims, 2 Drawing Sheets

METHOD AND APPARATUS FOR LINEAR VIDEO MIXER WITH DIGITAL CONTROL

BACKGROUND OF THE INVENTION

In a video special effects system, video mixer circuits are used to combine two video signals into a single signal in response to a control signal. In the simplest type of mixer, the control signal is either on or off, sometimes called a binary key signal, and this on/off signal determines which of the two input signals passes to the output at any given instant.

Another type of mixer is the linear mixer or linear keyer. In this case, the control signal may assume any value between full on and full off, and the resulting video output signal will be a mixture of the two input signals based on the instantaneous voltage of the control signal. For example, if the mixer selects input A when the control signal is low and input B when the control signal is high, slowly raising the control voltage from zero to full on will result in a cross fade or dissolve from input A to input B.

These control signals are usually analog signals; however in a digital system, the control signal is often generated by digital circuitry as a binary numerical value. In this case the numerical data is passed through a digital to analog converter to produce the linear control voltage used by the linear keyer.

In a digital controlled attenuator, sometimes used in audio hybrid digital/analog systems, a digital control word determines the amount of attenuation of a single signal attached to the input. However, in a hybrid digital/analog video system, it is desired to mix two input signals in proportion and to control the proportion using a digital control word.

It is therefore an object of this invention to produce a linear keyer which responds directly to numerical control data in binary form and uses this data to proportionally combine two video signals.

Other objects and features of the invention and the manner in which the invention achieves its purpose will be appreciated from the following description and the accompanying drawings which exemplify the invention, it being understood that changes may be made in the specific method and apparatus disclosed herein without departing from the essentials of the invention set forth in the appended claims.

BRIEF SUMMARY OF THE INVENTION

A linear video mixer with digital control comprised of two buffer means, whose inputs are connected to the two video signals to be mixed, each buffer means having a low output impedance and each output connected to alternative inputs of n electrically controlled double-throw switches, each switch having two inputs and an output connected to one of the inputs in response to an electrical control signal, where said respective n outputs of the switches are the inputs of n rungs of a 2R/R resistor ladder network, which network has an output connected to a buffer amplifier having relatively high input impedance, and where an n byte word provides the control signals for each of the n respective switches with the most significant bit of the control word connected to the switch control at one end of the switch-ladder network with the next least significant bit connected to the next switch control, and continuing on down accordingly to the opposing end of the switch-ladder network.

DESCRIPTION OF THE PREFERRED EMBODIMENT

Figure 1:
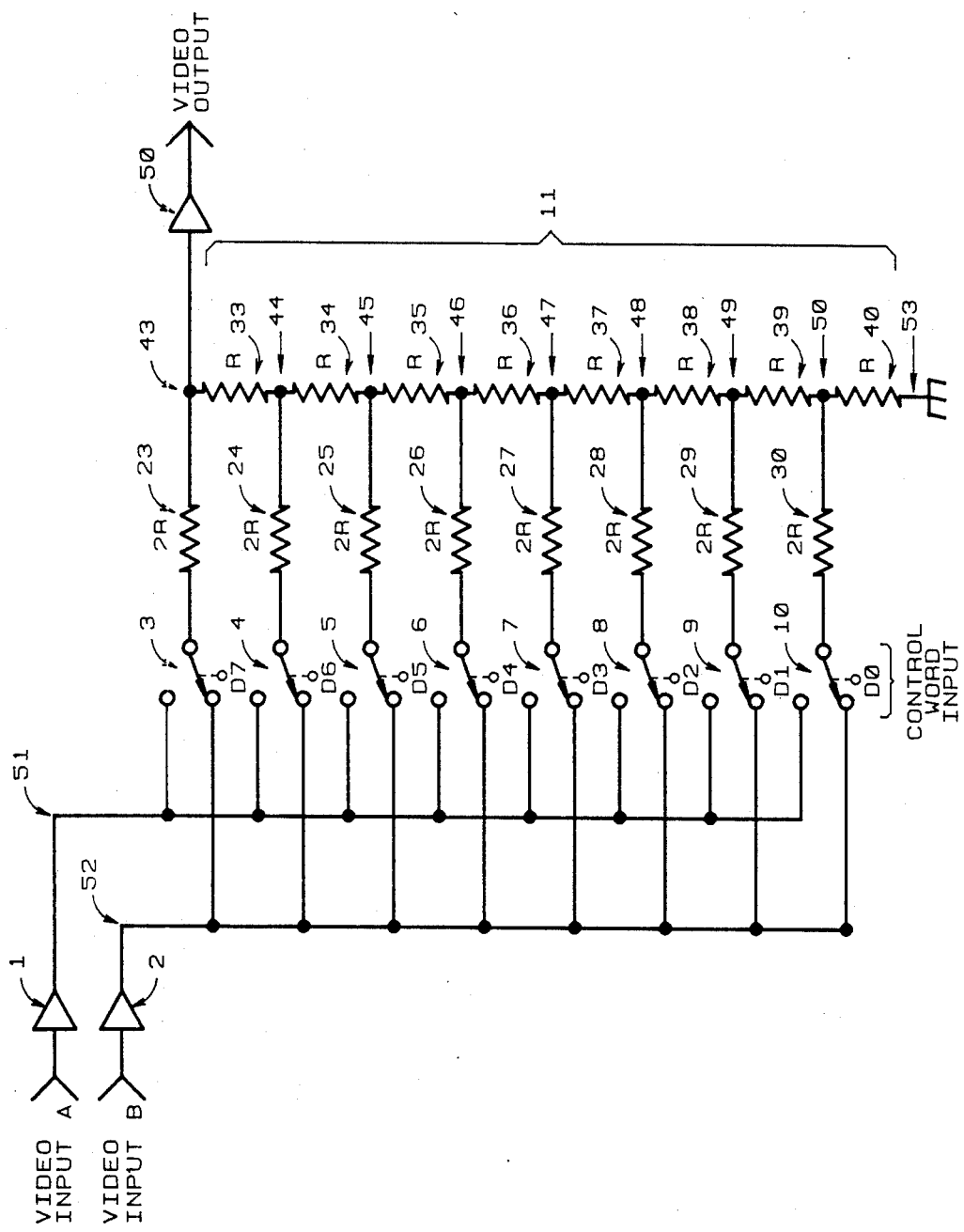
FIG. 1 is a drawing of the circuit showing the invention.

In FIG. 1, the two video signals to be combined are routed through buffer amplifiers 1 and 2 to provide low impedance characteristics to properly drive the keyer circuitry.

A series of electronic double-throw switches is necessary, one for each bit of the digital control word. Each switch is a double throw switch having an output that is electrically connected to one of two inputs, A and B, as determined by a high or low control signal at the control input of the switch.

The diagram shows eight switches (3-10), corresponding to an eight bit control word input. Amps (buffers) 1 and 2 are isolation type buffer amplifiers (that need not necessarily amplify) that also provide the necessary low output impedance at each output 51 and 52, to drive the resistor ladder network. Each of the A inputs of the switches 3-10 are connected (A corresponding to the top input, B corresponding to the lower input of each switch on the diagram) to the output 51 of the buffer 1, and each of the B inputs are likewise connected to the buffer 2 at 52, so that each of the A inputs will be connected to the output of their respective switch in response to a high level bit of the control word and each of the B inputs will be connected to the output of their respective switch in response to a low level of the control word. Thus, the control word 00000000 will result in all B inputs of the switches being switched to the output. It should be understood that it is the desired control word that is important here such that merely inverting one or more bits of the desired control word 00000000, for example, to 00100000 and then including an inverter at the input of the respective switch, will be the equivalent of the invention. The control input then of each switch (3-10) is connected to one of the eight lines of the eight bit control word. If the control bit for a given switch is high, for example, video input A is routed i.e. electrically connected, to the output terminal of the switch. If the control bit is low for that switch, video input B is routed to the output.

The switch outputs are each connected to one of the "rung" resistors 23-30 of the 2R/R resistor ladder 11. This resistor network is constructed as shown using resistors having two different values; R (the leg) and two times R, or 2R (the rung). For example, each resistor in the diagram marked "R" might have a value of 500 Ohms. In that case, all resistors marked 2R would be 1000 Ohm resistors. Each section of the 2R/R network then is shown as 23/33, 24/34, 25/35, etc. Each rung and leg are connected at a node (43-50) connected to the opposing end of the leg of the section above it, except for the last leg 40 connected to ground, and except for the node 43 on the end opposing ground, which serves as the output of the ladder network.

The resistors are arranged in such a way that the current to each rung contributes half as much current to the output node 43, as the input directly above it. Therefore, half the total current is "steered" by switch 3 which is controlled by the most significant bit of the control word. One quarter of the total current is "steered" by switch 4 which is controlled by the second-most significant bit, bit 6 of the control word. The result is that the control word causes the switches to apply the proper combinations of video signals A and B to the resistor network in response to the desired digital control word, and in increasing and decreasing proportions corresponding to the increasing or decreasing value of the control word. Thus, the resulting magnitude of video input A is directly proportional to the value of the control word. If the control word was incremented slowly from zero to 255 (the maximum 8 bit value) the output of the network would start with only video B visible and slowly fade with video A becoming more and more visible, until video B disappeared.

The output buffer amplifier 50 has a high input impedance necessary for the proper operation of the ladder network. It is not necessary that voltage amplification actually take place.

In the case of keying one video signal over another, the control word would rapidly change on a pixel by pixel basis. Each discrete numerical value of the control word would determine the mixture of the two input signals at each pixel position on the screen.

Figure 2:
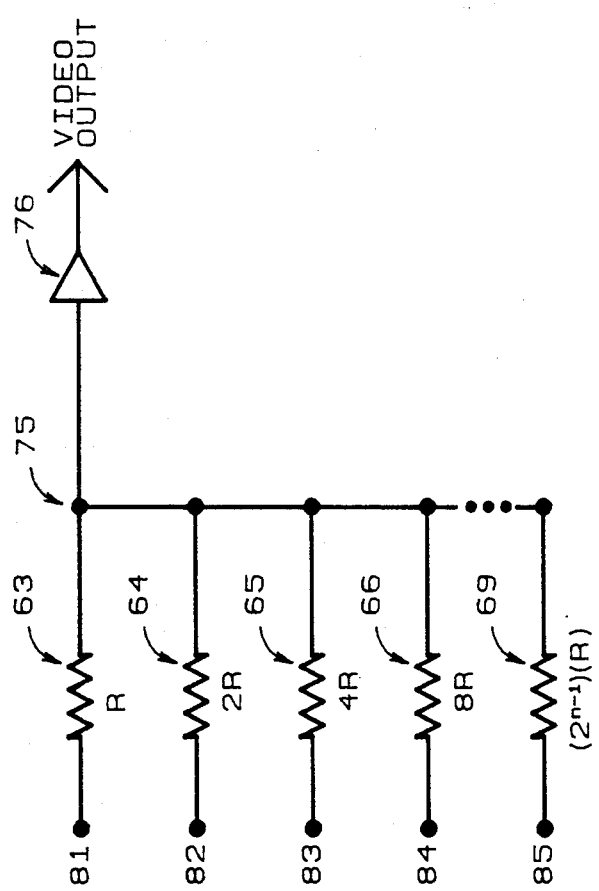
FIG. 2 is a drawing of an alternative resistor network for the resistor ladder network in FIG. 1.

The resistor ladder network may be replaced by a binary weighted resistor network such that each section attached to the output of each switch has a resistance value of R, 2R, 4R, respectively, up to $(2^{n-1})$ R, as shown in FIG. 2. However, because of manufacturing difficulties, it is difficult to obtain the necessary accurate resistance values. Switch outputs are individually connected (similar to FIG. 1) to each resistor section 81-85. As in FIG. 1, there can be any number of sections, provided that they equal to and correspond with the number of n bits and n switches. In FIG. 2 there would be no ground connection. Buffer 76 in FIG. 2 is the buffer 50 in FIG. 1.

While there have been shown and described particular embodiments of the invention, it will be obvious to those skilled in the art that changes and modifications may be made without departing from the invention or its equivalent and therefore it is intended by the appended claims to cover all such changes and modifications as fall within the true spirit and scope of the invention.

What is claimed is:

1. A linear video mixer, for use with a bit word digital control signals, for combining two input video signals A and B into a single output video signal C having a proportion of each signal A and B, said mixer comprised of:
   a. Individual buffer means having low impedance outputs, for isolating and producing from input video signals A and B buffered video signals A and B at the outputs of the buffer means;
   b. A series of n electronic double-throw switches, each having two inputs A and B, and a control input responsive to one bit of the n bit word, and an output, where the A inputs are electrically connected to buffered video signal A and the B inputs are electrically connected to buffered video signal B;
   c. A resistor ladder network having n sections with each section comprised of a leg and a rung each having a resistance and connected together at a node, where the leg has a resistance value of R and the rung resistance value if 2R, with the leg of each section connected to the node of the next adjacent section, and with the node of the first section comprising the output of the resistor ladder network and the leg of the last section comprising the ground of the network, and where the outputs of each of the n electronic switches are respectively electrically connected to each of the rungs of the resistor ladder network; and
   d. Output buffer means electrically connected to the output of the resistor ladder network for isolating the network, said output buffer means having an input with relatively high impedance.

2. A method for linearly mixing two input video signals A and b into a single output video signal C having a proportion of each signal A and B controlled by a digital n bit word control signal, said method comprised of:
   a. Isolating each respective video signal A and B using buffer means having relatively low output impedance to produce buffered video signals A and B at the outputs of the buffer means;
   b. Inputting the output video signals A and B to the two inputs respectively of each of a series of n electronic double-throw switches, each having two inputs A and B, and a control input and an output;
   c. Inputting each bit of the n bit control word to the control input of each of the n switches respectively to produce n switch outputs where the output from each switch is either a buffered video signal A or a buffered video signal B;
   d. Inputting each switch output to one section of a resistor ladder network having n sections, each section comprised of a leg and a rung portion connected to a node, where the leg has a resistance value of R and the rung resistance value is 2R, with the leg of each section connected to the node of the next adjacent section, and with the node of the first section comprising the output of the resistor ladder network and the leg of the last section comprising the ground of the network, and where the outputs of each of the n electronic switches are respectively connected to each of the rungs of the resistor ladder network, to produce an unbuffered mixed video signal at the output of the ladder network; and
   e. Buffering the unbuffered mixed video signal to produce a mixed video output signal using buffer means having relatively high input impedance for isolating the network.

3. A linear video mixer, for use with n bit word digital control signals, for combining two input video signals A and B into a single output video signal C having a proportion of each signal A and B, said mixer comprised of:
   a. Individual buffer means having low impedance outputs, for isolating and producing from input video signals A and B buffered video signals A and B at the outputs of the buffer means;
   b. A series of n electronic double-throw switches, each having two inputs A and B, and a control input responsive to one bit of the n bit word, and an output, where the a inputs are electrically connected to buffered video signal A and the B inputs are electrically connected to buffered video signal B;
   c. A weighted resistor network having n sections, each section having an end, all ends of which are electrically connected to comprise the output of the network, a first section having a resistance value of R, and the subsequent sections having a resistance value of $(2^{n-1})R$ with the resistance values of the sections increasing from one end of the network to the opposing end, and where the outputs of each of the n electronic switches are respectively electrically connected to each of the resistor sections; and d. Output buffer means electrically connected to the output of the resistor ladder network for isolating the network, said output buffer means having inputs with relatively high impedance.

* * * * *